US010459862B2

(12) United States Patent
Miluzzi et al.

(10) Patent No.: US 10,459,862 B2
(45) Date of Patent: *Oct. 29, 2019

(54) DYNAMIC DEFINITION OF SLAVE ADDRESS IN I2C PROTOCOL

(71) Applicant: STMICROELECTRONICS S.R.L., Agrate Brianza (IT)

(72) Inventors: Eugenio Miluzzi, Milan (IT); Marco Leo, Locate di Triulzi (IT); Marco Castellano, Pavia (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/219,803

(22) Filed: Dec. 13, 2018

(65) Prior Publication Data

US 2019/0114274 A1 Apr. 18, 2019

Related U.S. Application Data

(63) Continuation of application No. 15/363,932, filed on Nov. 29, 2016, now Pat. No. 10,204,066.

(51) Int. Cl.
*G06F 13/12* (2006.01)
*G06F 13/364* (2006.01)
(Continued)

(52) U.S. Cl.
CPC .......... *G06F 13/364* (2013.01); *G06F 13/404* (2013.01); *G06F 13/4282* (2013.01); *G06F 13/4291* (2013.01); *G06F 2213/0052* (2013.01)

(58) Field of Classification Search
None
See application file for complete search history.

(56) References Cited

U.S. PATENT DOCUMENTS 7,653,757 B1 * 1/2010 Fernald ............... G06F 1/26
323/222
7,685,320 B1 * 3/2010 Wishneusky ........ G06F 1/26
323/222
(Continued)

OTHER PUBLICATIONS

Asahi Kasei Microdevices Corporation, "AK5703: 4-Channel 24-bit ADC with PLL & MIC-AMP," Data Sheet, May 8, 2013, 76 pages.
(Continued)

*Primary Examiner* — Cheng Yuan Tseng
(74) *Attorney, Agent, or Firm* — Seed Intellectual Property Law Group LLP

(57) ABSTRACT

A system includes a multi-conductor bus, a master device coupled to the multi-conductor bus, and at least one slave device coupled to the multi-conductor bus. The multi-conductor bus has a clock line and a data line. The master device is arranged to transmit an address configuration sequence, and the at least one slave device is arranged to configurably determine its own address based on at least one portion of the address configuration sequence. The at least one slave device has a physical address configuration input coupled to either a fixed voltage potential or a changing voltage potential. The at least one slave device is arranged with a first address during a pre-initialization state and arranged with a second address during a post-initialization state. During the post-initialization state, the first address and the second address are a same address when the address configuration sequence represents the first address and the first address and the second address are different addresses when the address configuration sequence does not represent the first address.

24 Claims, 8 Drawing Sheets

(51) Int. Cl.
*G06F 13/42* (2006.01)
*G06F 13/40* (2006.01)

(56) References Cited

U.S. PATENT DOCUMENTS

| | | | |
|---|---|---|---|
| 7,711,867 | B2 | 5/2010 | Deshpande et al. |
| 7,793,005 | B1* | 9/2010 | Fernald ............... H02M 3/1584 |
| | | | 323/222 |
| 8,040,215 | B2 | 10/2011 | Zakriti |
| 8,239,597 | B2* | 8/2012 | Wishneusky ........... H02J 1/102 |
| | | | 710/107 |
| 8,489,786 | B2* | 7/2013 | Radhakrishnan ... G06F 13/4291 |
| | | | 710/10 |
| 8,892,798 | B2 | 11/2014 | Tailliet et al. |
| 9,007,951 | B2 | 4/2015 | Reidl et al. |
| 9,152,598 | B2 | 10/2015 | Fosse et al. |
| 9,477,634 | B2 | 10/2016 | Bell et al. |
| 10,135,634 | B2* | 11/2018 | Scherr ............... H04L 12/40019 |

OTHER PUBLICATIONS

Cañete et al., "Sensors Systems for Smartphones, Tablets and IoT: New Advanced Design Approach," *Sensors & Transducers* 187(4):1-9, 2015.

Linear Technology, "LTC2451: Ultra-Tiny, 16-bit DS ADC with I²C Interface," Data Sheet, Revision F, Jun. 2010, 18 pages.

NXP Semiconductors, "UM10204: I²C-bus specification and user manual," User Manual, Revision 6, Apr. 4, 2014, 64 pages.

Panasonic, "AN12978A: Monaural BTL amplifier IC with built-in AGC (I²C bus-control correspondence)," Data Sheet, Aug. 5, 2008, 21 pages.

\* cited by examiner

| CONFIGURATION | FALL | RISE | |
|---|---|---|---|
| 1 – GND | Always 1 | Always 1 | ACK |
| 2 – VDD | Always 0 | Always 0 | NACK |
| 3 – SDA | Not(SDA) | Not(SDA) | NACK |
| 4 – SCL | Always 1 | Always 0 | NACK |

FIG. 4A

| CONFIGURATION | FALL | RISE | |
|---|---|---|---|
| 1 – GND | Always 1 | Always 1 | NACK |
| 2 – VDD | Always 0 | Always 0 | ACK |
| 3 – SDA | Not(SDA) | Not(SDA) | NACK |
| 4 – SCL | Always 0 | Always 1 | NACK |

FIG. 4B

DYNAMIC DEFINITION OF SLAVE ADDRESS IN I2C PROTOCOL

BACKGROUND

Technical Field

The present disclosure generally relates to the identification of slave devices on a local communications network. More particularly, but not exclusively, the present disclosure relates to dynamically defining addresses of slave devices coupled to the local communications network.

Description of the Related Art

In many electronic systems, it is desirable to control peripheral devices using data passed across a local communications network. One such network includes a multi-conductor bus that follows an INTER-INTEGRATED CIRCUIT (I2C) protocol. The I2C protocol created by PHILIPS SEMICONDUCTOR governs data communications between compatible I2C devices over two wires. Devices that conform to the I2C protocol send information serially over a pair of electrical conductors wherein one conductor is used to pass data (SDA) and one conductor is used to pass a clock (SCL) signal.

FIG. 1 is a schematic diagram of a system 1 coupling five conventional devices 2, 4, 6, 8, 10 in accordance with an I2C protocol. In the system 1, a conventional master device 2 is communicatively coupled to a first conventional slave device 4, a second conventional slave device 6, a third conventional slave device 8, and a fourth conventional slave device 10. The five conventional devices are commonly coupled together with a serial clock line (SCL) 12 and a serial data line (SDA) 14. Collectively, the SCL 12 line and the SDA 14 line may be referred to as a "bus."

The I2C protocol provides for conventional master devices and conventional slave devices. A conventional master device 2 directs operations on the bus at a present time. That is, the conventional master device 2 controls the clock SCL 12 and generates START and STOP signals. Conventional slave devices 4, 6, 8, 10 monitor activity on the bus and act on control commands and data passed on the bus by the conventional master device 2. Correspondingly, when conventional slave devices 4, 6, 8, 10 are driving the bus to communicate data, the conventional master device 2 will monitor bus activity. Monitoring by the conventional devices typically includes sampling by Schmitt Trigger inputs, but other monitoring circuitry is also considered.

The conventional master device 2 can send data to any of the conventional slave devices 4, 6, 8, 10, and the conventional master device 2 can receive data from any of the conventional slave devices 4, 6, 8, 10. The conventional slave devices 4, 6, 8, 10 cannot directly transfer data between themselves. Instead, one conventional slave device must first pass the data to the conventional master device 2, and the conventional master device 2 must re-communicate the data to the other conventional slave device. In addition, since the I2C protocol makes no provisions for direct slave-to-slave communications, in order to carry out such data transfer, the conventional devices of system 1 must be particularly arranged for such operations.

In the system 1 of FIG. 1, a single conventional master device 2 is illustrated. The I2C protocol provides for multiple conventional master devices in a single system, but this is not shown in FIG. 1. Multi-master operations are more complex and include particular arbitration of the bus and particular clock synchronization, but such operations are not necessary to the understanding of the present disclosure.

According to the I2C protocol, the SCL 12 and SDA 14 lines operate bi-directionally. Thus, any of the conventional devices on the bus are permitted to drive either line. Both lines of the I2C bus will idle in a logic "high" state (i.e., HIGH or HI), and to this end, both the SCL 12 and SDA 14 lines are arranged as open-collector/open-drain outputs. Each line is pulled to its logic HIGH state using, for example, a resistor that electrically couples the subject line to a source voltage. Typically, resistance values range from about 1 kΩ to 10 kΩ, but other resistances are also considered. In this case, pullup currents are typically 1 mA or less.

This I2C physical architecture implements a wired logical "AND" function such that any conventional device on the bus that forces (e.g., pulls) voltage down causes all of the other conventional devices on the bus to detect logic "low" data bit value (i.e., LOW or LO). Conversely, to communicate a logic HIGH data bit value on one of the bus lines, all devices stop driving that particular bus line, and the line is pulled HIGH. Typically, supply voltages for an I2C bus range from 1.2V to 5.5V, but other voltages are also used in some implementations.

In the system of FIG. 1, information is communicated across the bus serially. That is, data bits are communicated during a timed assertion and release of the SCL 12 line by one device on the bus such that clock pulses are detected by all of the conventional devices on the bus. Concurrently, to pass either logic HIGH data bit values or logic LOW data bit values, the one conventional device controlling the bus also coordinates timed assertion and release of the SDA 14 line with the clock pulses of the SCL 12 line. The other non-driving (e.g., "listening") conventional devices on the bus use the detected clock pulses to direct a sampling operation on the SCL 12 and SDA 14 lines and thereby capture the serially communicated bits of data.

In a conventional I2C data transfer operation, the bus (i.e., SCL 12 and SDA 14) is operated to indicate a START condition, which includes raising both the clock line SCL 12 and the data line SDA 14 HIGH, and, while the SCL 12 line is HIGH, driving the SDA 14 line LOW.

Subsequently, after the START condition is asserted, the SCL 12 line is controllably asserted and released to generate a clock pulse pattern on the SCL 12 line.

Conventional clock speeds on an I2C bus may range from zero to 100 kHz and other, faster clock speeds (e.g., up to 400 kHz, up to 3.4M Hz, and faster) are also contemplated.

Concurrent to the clock pulses formed with the SCL 12 line, a first byte of data is serially communicated on the bus, bit-by-bit, by conventional master device 2. The first byte contains a conventional slave device address and a direction that data will flow. In an exemplary case, the address is 7 bits long, followed by a data direction bit. The address is transferred with the most significant bit first, and the data direction bit will indicate whether one or more subsequent bytes will be provided by the conventional master device 2 (i.e., the data direction bit indicates a "write" operation) or whether one or more subsequent bytes will be provided by the addressed conventional slave device (i.e., the data direction bit indicates a "read" operation).

In a system 1 that includes a local I2C communication network, conventional slave devices are identified by different addresses, each of which is unique across the network. With respect to FIG. 1, each conventional slave is assigned a 7-bit address, but addresses having different lengths (e.g., 10 bits) are also contemplated. In some cases, all of the bits of a conventional slave device address are internally and unchangeably fixed. In some cases, some bits of the conventional slave device address are internally defined while other bits of the slave address are externally configured at the time of system manufacture. In still other cases, such as in FIG. 1, all of the bits of a conventional slave device address are defined at the time of system manufacture.

The assignment of an address to each conventional slave device, as illustrated in the system 1 of FIG. 1, is carried out by wiring defined address pins of the conventional slave devices 4, 6, 8, 10, to either HIGH or LOW voltage potentials. In this way, "generic" conventional slave devices may be provided by manufacturers, and systems integrators may hard-wire each conventional device with a desired unique address.

With respect to the conventional slave devices of FIG. 1, the first conventional slave device 4 is wired with an address "3" (i.e., 000 0011B), the second conventional slave device 6 is wired with an address "7" (i.e., 000 0111B), the third conventional slave device 8 is wired with an address "11" (i.e., 000 1011B), and the fourth conventional slave device 10 is wired with an address "15" (i.e., 000 1111B).

After the first byte of data is transferred by the conventional master device 2, which includes the conventional slave device address, the addressed conventional slave device will acknowledge its recognition of the first byte by passing an acknowledgement bit (ACK). Once the acknowledgement bit is passed, data will be transferred across the bus. The direction that data will be transferred is determined by the data direction bit that was passed as part of the first data byte communicated by the conventional master device 2.

In cases where the data direction bit indicated a write operation, the conventional master device 2 will maintain control of the SCL 12 line, and the conventional master device 2 will communicate one or more subsequent data bytes to the addressed conventional slave. In cases where the data direction bit indicated a read operation, the addressed conventional slave device will control the SCL 12 line, and the conventional slave device will communicate one or more data bytes to the conventional master device 2. The conventional device (i.e., the conventional master 2 or the addressed conventional slave device) that receives the subsequent data will assert an ACK bit on the bus after the data is successfully received.

After passing one or more bytes of data over the communication bus, communications will end when a STOP condition is asserted on the communication bus. In a conventional I2C data transfer operation, asserting the STOP condition includes raising the clock SCL 12 line HIGH, releasing the SDA 14 line so that it falls LOW, and raising the SDA 14 line HIGH while the SCL 12 line remains HIGH.

Communications between the conventional master device 2 and one or more conventional slave devices 4, 6, 8, 10 may be ongoing according to the operations of the conventional master and slave devices. In some cases, for example, the data passed by the conventional master device 2 to a particular conventional slave device is a command, which is acted on by the particular conventional slave device. Communications may operate according to a particular protocol. One such conventional protocol is defined in an I2C-BUS SPECIFICATION AND USER MANUAL, UM10204, Rev. 6-4 April 2014, which is provided by NXP and included herein by reference.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

Reducing the number of external, physical pins of a slave device on a communication bus is desirable. Different from the conventional devices, a reduced number of external pins can be used to increase the number of uniquely identifiable devices on a communication bus. For example, in a configuration that implements an I2C bus, four separate but identical I2C slave devices can be uniquely identified when each of the devices uses only a single address input. That is, four devices may differently wire a single dynamic address input, which is a physical structure on the slave device, to a particular voltage potential, and based on the wiring, each of the four devices may dynamically assign to itself its own different slave address.

A system may be summarized as including: a multi-conductor bus having a clock line and a data line; a master device coupled to the multi-conductor bus and arranged to transmit an address configuration sequence; and at least one slave device coupled to the multi-conductor bus and arranged to configurably determine its own address based on at least one portion of the address configuration sequence, the at least one slave device having a physical address configuration input coupled to either a fixed voltage potential or a changing voltage potential, wherein the at least one slave device is arranged with a first address during a pre-initialization state and arranged with a second address during a post-initialization state wherein during the post-initialization state, the first address and the second address are a same address when the address configuration sequence represents the first address and wherein the first address and the second address are different addresses when the address configuration sequence does not represent the first address.

The fixed voltage potential may be either a source voltage potential or a ground voltage potential. The changing voltage potential may be realized by coupling the physical address configuration input to either the clock line or the data line. The at least one slave device may include a first slave device, a second slave device, a third slave device, and a fourth slave device, wherein the physical address configuration input of the first slave device is coupled to a ground potential, wherein the physical address configuration input of the second slave device is coupled to a source potential, wherein the physical address configuration input of the third slave device is coupled to the clock line, and wherein the physical address configuration input of the fourth slave device is coupled to the data line. The address configuration sequence may include a start command, a plurality of address bits, and a data direction bit. The address configuration sequence may follow an INTER-INTEGRATED CIRCUIT (I2C) protocol. The at least one slave device may include: an inverter circuit coupled to the physical address configuration input. The at least one slave device may include: an edge detection circuit coupled to the clock line; and a data capture circuit, the data capture circuit arranged to recognize a first voltage potential, a second voltage potential, or the first voltage potential and the second voltage potential on the physical address configuration input when at least one clock edge is detected by the edge detection circuit, wherein data captured by the data capture circuit is used to select the second address. The system may be a mobile device. The at least one slave device may include a first microphone slave device, a second microphone slave device, a third microphone slave device, and a fourth microphone slave device.

An I2C slave device address configuration method may be summarized as including: providing a first slave device coupled to a multi-conductor bus having a clock line and a data line, the first slave device having a physical address configuration input coupled to one of a fixed voltage potential, the clock line, or the data line; receiving, from a master device coupled to the multi-conductor bus, an address configuration sequence during an initialization stage; detecting at least one clock edge during receipt of at least a portion of the address configuration sequence; based on the detecting, capturing data on the physical address configuration input; based on the captured data, setting a post-initialization address of the first slave device; and after the initialization stage, responding with the first slave device to commands passed on the multi-conductor bus by the master device, said commands including the post-initialization address.

An I2C slave device address configuration method may include: determining whether the physical address configuration input is coupled to a ground line, a source line, the clock line, or the data line. Setting the post-initialization address of the first slave device may include: retrieving the post-initialization address from a lookup table. The address configuration sequence may include a seven-bit address sequence and the data captured on the physical address configuration input is captured during a seventh bit of the seven-bit address sequence. The first slave device may include at least one microphone circuit.

An I2C slave device may be summarized as including: at least one functional circuit; a multi-conductor bus interface having a clock line input and a data line input; a physical address configuration input coupleable to a first fixed signal, a second fixed signal, or one of the multi-conductor bus interface inputs; and address configuration sequence logic, the address configuration sequence logic including a clock edge detection circuit and a data capture circuit, the address configuration sequence logic configured to:

capture a first address sequence passed via the data line input; detect with the data capture circuit, based on at least one signal from the clock edge detection circuit, at least one state of the physical address configuration input; determine, based on the at least one state of the physical address configuration input, whether the physical address configuration input is electrically coupled to a first fixed signal, a second fixed signal, the clock line input, or the data line input; and set, based on the determination of which signal is coupled to the physical address configuration input, an address of the I2C slave device.

The I2C slave device may be configurable with a first address if the physical address configuration input is coupled to a ground potential, a second address if the physical address configuration input is coupled to a source potential, a third address if the physical address configuration input is coupled to the clock line input, and a fourth address if the physical address configuration input is coupled to the data line input. After the I2C slave device is configured with a first address during an initialization stage, the I2C slave device may respond to I2C commands that include the first address. The first address may be retrieved from a lookup table during the initialization stage. The I2C slave device may include at least two physical address configuration inputs.

This Brief Summary has been provided to introduce certain concepts in a simplified form that are further described in detail below in the Detailed Description. Except where otherwise expressly stated, the Brief Summary does not identify key or essential features of the claimed subject matter, nor is it intended to limit the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIGS. 4A-4B are command and state tables representing operations of the address configuration sequence logic configured within the dynamically addressable slave devices of FIG. 2;

DETAILED DESCRIPTION

The conventional system of addressing slave devices on a multi-conductor bus (e.g., such as a bus that conforms to an INTER-INTEGRATED CIRCUIT (I2C) protocol) has been found by the present inventors to have shortcomings, particularly in systems where physical space is very limited. It is discovered that using multiple pins, pads, or other physical structures to connect each slave device to a set of voltage potentials in a particular configuration is undesirable. In addition, systems that require fixation of a unique address in each slave device before or during deployment, and systems that require additional structures to program a unique address in each slave device are also undesirable. Instead, it would be more desirable if a single physical structure could be used to assign a distinct address to a plurality of slave devices (e.g., four dynamically addressable slave devices).

An embodiment of the present invention includes address configuration sequence (ACS) logic in one or more slave devices. Due to the presence of such ACS logic, a single or a small number of pins, pads, or other physical structures can be used by the ACS logic to uniquely address each inventive slave device, thereby making the slave device dynamically addressable. A plurality of inventive, dynamically addressable slave devices can operate together on a multi-conductor bus either with or without conventional slave devices.

Figure 2:
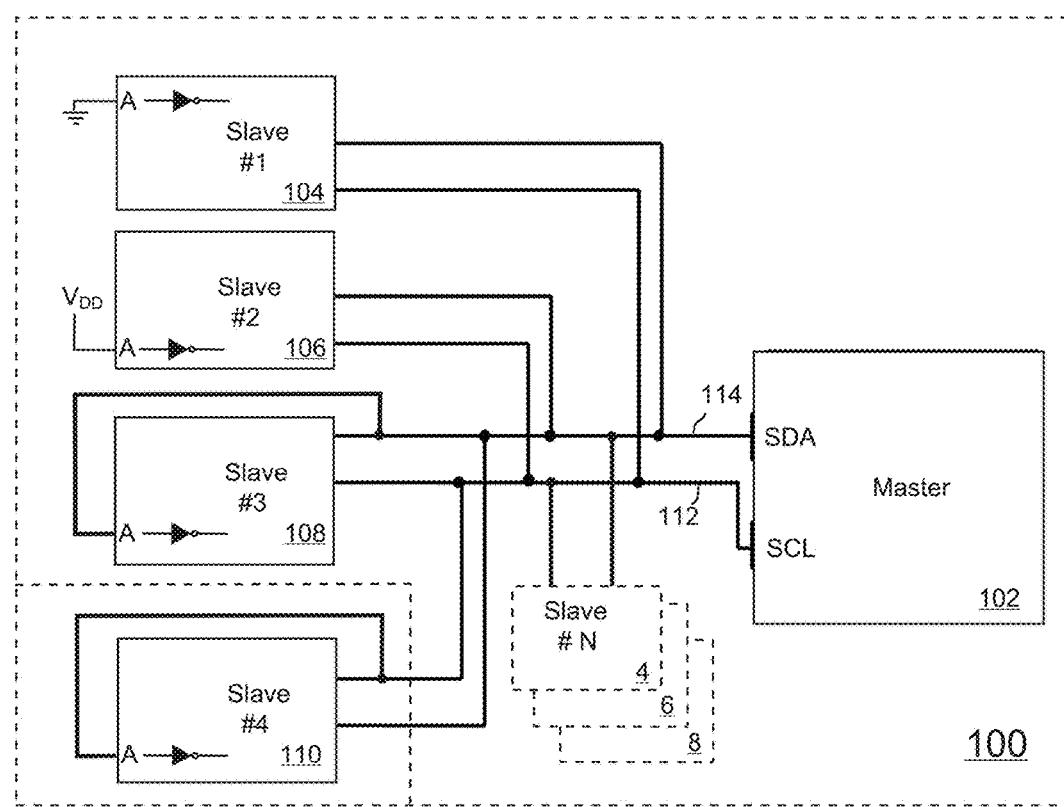
FIG. 2 is a schematic diagram of a system coupling a plurality of dynamically addressable devices in accordance with a local serial communications I2C protocol.

In FIG. 2, which illustrates an exemplary case set forth in a non-limiting descriptive way merely to demonstrate one embodiment, four inventive, dynamically addressable slave devices and a master device are configured on a multi-conductor bus. One or more conventional slave devices may also be configured on the bus, but the presence or absence of any conventional slave devices does not alter the operation or configuration of the exemplary case, and so conventional slave devices are not described further in the exemplary case.

Each of the four inventive, dynamically addressable slave devices includes a physical address configuration input (e.g., a pin, a pad, or other structure). Each of the slave devices may also have a fixed portion of an address internally configured (e.g., using hard-wired logic, a lookup table, a fixed or reprogrammable memory, or the like). In this way, the single physical address configuration input, in combination with the optional internal fixed address bits when such bits exist, is used during an initialization stage to dynamically cause a determination of the address the slave device will assign to itself (i.e., the address it will respond to) after the initialization stage completes.

For simplicity in the exemplary case, it is assumed that each slave device responds to a seven-bit (7-bit) address, and during the initialization stage, six of the address bits are fixed internally within each slave device. In addition, merely to simplify the description of the exemplary case, it is assumed that during the initialization stage, the first six initialization address bits fixed in each slave device are in the first six bit positions of the slave device address passed on the bus, and the seventh bit position is used by the ACS logic in each slave device to determine its post-initialization address.

In more detail, each slave device has the same ACS logic, and during the initialization process, the ACS logic will cause each slave device to dynamically address itself based on the wiring configuration of its physical address configuration input. Each of the four slave devices dynamically assigns itself a different address from any of the other slave devices because each has wired its physical address configuration input in a different way. During the initialization stage, the ACS logic in each slave recognizes the first six address bits passed by the master on the bus, which causes the ACS logic to evaluate the state of its physical address configuration input at the time the seventh bit is passed from the master device. Based on the state of the physical address configuration input, the ACS logic will dynamically assign the slave address. The dynamically assigned slave address may include some or all of the first six address bits used during the initialization stage, or the dynamically assigned slave address may consist entirely of other bits selected in a different way.

Considering the four dynamically addressable slave devices in FIG. 2, the physical address configuration input (PACI) of the first slave device is coupled to a ground potential, the PACI of the second slave device is coupled to a source (e.g., $V_{DD}$) potential, the PACI of the third slave device is coupled to the data line (e.g., SDA) of the multi-conductor bus, and the PACI of the fourth slave device is coupled to the clock line (e.g., SCL) of the multi-conductor bus. In this configuration, a single physical address configuration input (PACT) can be used to assign a distinct address to each of four slave devices.

During the initialization stage, a master device begins a command sequence by sending seven bits of address information across the multi-conductor bus. It is presumed in the exemplary case that the first six bits sent by the master device match the internally fixed six bits of each of the four devices. When the seventh address bit is sent by the master device, each of the four slave devices triggers internal operations on one or more of the sensed clock edges asserted by the master device on the SCL line. One of the triggered operations of each slave is to capture data on the PACI and capture data on the SDA line. In this way, each of the four slave devices can determine how its PACI line is electrically coupled.

Considering still the exemplary case, when the seventh address bit is sent by the master device, the ACS logic of the first slave device can determine that the PACI of the first slave device is electrically coupled to ground, and it is not electrically coupled to the source voltage, the SDA line, or the SCL line. Similarly, the ACS logic of the second slave device can determine that the PACI of the second slave device is electrically coupled to source voltage and not ground, the SDA line, or the SCL line; the ACS logic of the third slave device can determine that the third slave device is coupled to the SDA line, and the ACS logic of the fourth slave device can determine that the fourth slave device is coupled to the SCL line. Since the ACS logic of each slave device can determine which one of the four possible PACI configurations is wired, the ACS logic can use this determination information to select a unique address for the particular slave device.

After the determination of the PACI configuration is made by the ACS logic of each slave device, the ACS logic within each of the four slave devices sets an address for the respective slave device that will be used after the initialization phase completes. The post-initialization address may include some or all of the fixed internal bits, or the post-initialization address may include an entirely different 7-bit address.

Following the exemplary case still further, without limitation, the inventive slave device may determine that its PACI is coupled to ground. With this determination, the slave device selects a first address that it will respond to after initialization. If the slave device determines its PACI is coupled to a source voltage, the slave device will select a second address that it will respond to after initialization. If the PACI is coupled to the SDA line, the slave device will select a third address, and if the PACI is coupled to the SCL line, the slave device will select a fourth address. Each of the first, second, third, and fourth addresses are different, and the selection may be made by the ACS logic using a lookup table, combinatorial gating logic, an internally operating program, a state machine, or some other logic.

It is thus recognized by the inventors that four identical slave devices (e.g., four microphones) can be implemented into an electronic system (e.g., a smart phone). Each of the four devices may electrically couple its PACI to a different one of ground potential, source voltage potential, the SDA line, or the SCL line. Then, during system initialization, the master device will send a single command sequence, and each of the four identical slave devices will select a different address that it will respond to after initialization.

The architecture described herein is powerful and beneficial because a plurality of identical but uniquely addressable devices can be manufactured into a system without individually selecting each device for its placement. This architecture is further desirable because the unique addressing is implemented with a reduced amount of physical space. As described in the exemplary case, for example, the unique addressing of four devices is based on the wiring of only a single physical structure instead of two or more physical structures as would be required in the conventional slave devices. Applying this same teaching to other embodiments of the inventive architecture, if eight devices are to be uniquely addressed, then only two structures could be used to address the eight devices, three structures could be used to uniquely address 16 devices, and so on.

The present inventive concepts may be understood more readily by reference to the following detailed description of the preferred embodiments of the invention. It is to be understood that the terminology used herein is for the purpose of describing specific embodiments only and is not intended to be limiting. It is further to be understood that unless specifically defined herein, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with integrated circuits, bus communications, timing circuits, synchronization, and the like have not been shown or described in detail to avoid unnecessarily obscuring descriptions of the embodiments.

In many electronic systems, it is desirable to control peripheral devices using data passed across a local communications network. In the present disclosure, the local communications network is enabled by a multi-conductor bus (e.g., a two-wire interface) that communicatively couples at least one control device to a plurality of controlled devices. Embodiments of such a multi-conductor bus in the present disclosure are described in cooperation with terminology and nomenclature of an INTER-INTEGRATED CIRCUIT (I2C) protocol as created, for example, by PHILIPS SEMI-CONDUCTOR. As further described herein, however, the local communications network and multi-conductor bus are not limited to compliance with an I2C protocol.

Devices that conform to the I2C protocol pass information serially using a two-wire interface wherein a first conductor (SDA) is used to pass data signals and a second conductor (SCL) is used to pass clock signals.

Turning to FIG. 2 in more specific detail, FIG. 2 is a schematic diagram of a system 100 coupling a plurality of dynamically addressable devices in accordance with a local serial communications protocol such as an I2C protocol. System 100 may represent a mobile device such as a smartphone, a tablet computer, a laptop computer, a wearable device (e.g., smart watch, smart pendant, smart apparel, etc.), a global positioning system (GPS), an in-vehicle computing device or other automotive device, or any other electronic system that employs a plurality of slave devices of the types described in this present disclosure. For example, system 100 may also represent a piece of industrial equipment, military equipment, or some other type of computing device; system 100 may be embodied in a one or more dies formed in an integrated circuit, system 100 may be resident in discrete electronic devices; or system 100 may be provided in some other configuration.

In system 100, a master device 102 is arranged to communicate with a first slave device 104, a second slave device 106, a third slave device 108, and a fourth slave device 110. System 100 may in some cases include more than a single master device 102, and in addition or in the alternative, more or fewer slave devices 104, 106, 108, 110, are also contemplated.

Slave devices 102, 104, 106, 108 include the address configuration sequence (ACS) logic and dynamic addressing capabilities that are described in detail herein. These slave devices 102, 104,106, 108 are distinguished from earlier conventional slave devices 4, 6, 8, 10 (FIG. 1) that do not have logic to carry out these dynamic addressing features.

Figure 1:
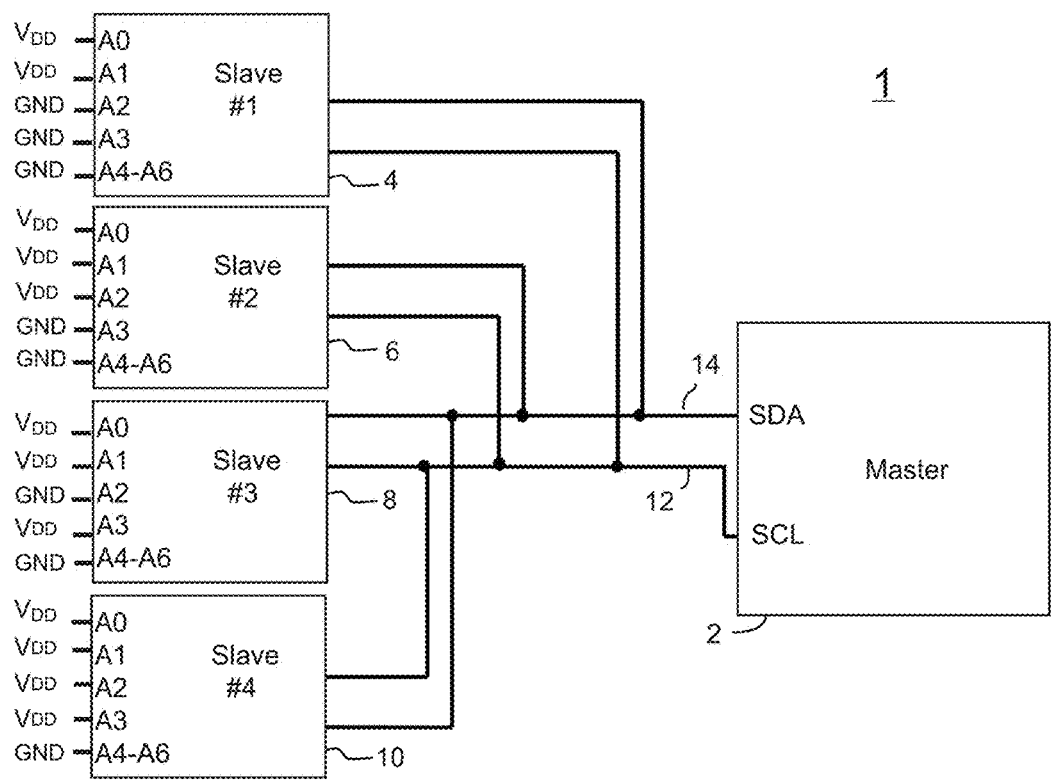
FIG. 1 is a schematic diagram of a system coupling five conventional devices in accordance with an I2C protocol.

In some cases, system 100 may also include conventional slave devices 4, 6, 8, such as the conventional slave devices described with respect to FIG. 1. In order to simplify and focus the present specification, and because system 100 can optionally operate with the presence or absence of conventional slave devices 4, 6, 8, no further discussion of conventional slave devices will be made in detail, and where conventional slave devices are discussed, the discussion will clearly identify such slave devices as "conventional." In contrast, other uses of the term "slave device" in the present disclosure, such as with reference to the slave devices 102, 104, 106, 108 in FIGS. 2-7 and as recited in the attached claims, means a slave device that includes ACS logic and dynamic addressing capabilities along the lines described with reference to slave devices 102, 104, 106, 108. Thus, a "slave device" as the term is used herein means a slave device arranged to carry out one or more of the novel and nonobvious features described herein even when the terms "dynamic addressing," "dynamically addressable," "address configuration," and the like are not also used.

A master device as employed in system 100 may be a microcontroller, a microprocessor, a single- or multi-core processor, a peripheral interface controller (PIC), a state machine, a dedicated or shared controller, a digital signal processor, or the like. The master device is arranged to assert particular clock signals and particular data signals on a multi-conductor bus. For example, the master device may assert clock pulses having both rising and falling edges on a clock line SCL 112. The master device may also drive or otherwise assert data pulses (e.g., bits, bytes, or other data) on a data line SDA 114. During operation, the master device may also present a tri-state (e.g., a high-impedance) condition on the data line SDA 114 in order to listen to (e.g., detect, capture) data communicated from a slave device.

A slave device as employed in system 100 may be any electronic device that receives commands or data from a master device, and a slave device may be any electronic device that provides commands or data to a master device. Non limiting examples of slave devices include memory, real time clocks, counters, microphones or other microphone circuits, environmental sensors (e.g., temperature, pressure, motion, and the like), analog-to-digital converters, digital-to-analog converters, microprocessors, micro- or other controllers, state machines, buffers, hubs, repeaters, range extenders, general purpose input/output (GPIO) devices, multiplexers and other switching circuits, display drivers, bridge circuits, bus controllers, level translators, power supply circuits, or some other type of functional electronic circuit.

The devices in system 100 are communicatively coupled across a multi-conductor bus, which in the exemplary embodiment of FIG. 2 has a plurality of wires. In FIG. 2, two wires of the multi-conductor bus are the serial clock line SCL 112 and the serial data line SDA 114. More or fewer lines such as ground lines, voltage supply lines, chip enable lines, control lines, status lines, or the like may or may not be included in the multi-conductor bus, and any such lines are not illustrated for ease in understanding the underlying subject matter.

Various ones of the devices of system 100 are illustrated with dashed lines at various points. The dashed lines generally indicate optional circuits, optional configurations, or some other feature that may optionally be included or excluded without departing from the spirit of the present disclosure.

In some cases, system 100 is formed in a single integrated circuit. The single integrated circuit may include one or more separate and distinct components (e.g., dies) which bear one or more of the devices. Alternatively, the single integrated circuit may include a single die that carries all of the devices. In other cases, system 100 is formed with two or more integrated circuits or other separate and distinct devices. Accordingly, it is recognized that system 100 may be constructed in many ways using integrated devices, discrete devices, or a combination of integrated and discrete devices.

A command sequence in an I2C protocol, which may be implemented with system 100, generally includes operations identified in Table 1.

TABLE 1

I2C Basic Command Sequence

1. Asserting a START condition;
2. Serially sending a slave address;
3. Sending a direction bit (e.g., Read = 1; Write = 0);
4. Waiting for an acknowledge bit;
5. Serially sending/receiving a data byte (8 bits);
6. Waiting for (or sending) an acknowledge bit;
7. Asserting a STOP bit.

Optionally, the particular protocol may permit certain variations to the command sequence. For example, the operations at 5 and 6 in Table 1 can be repeated one or more times so that many bytes of data may be transferred. In addition, addresses may be 2 bits, 7 bits, 10 bits, or some other number of bits.

Conventional slave devices are provided with addresses in a limited number of ways. In some cases, the address is hard programmed or otherwise encoded into the conventional slave device at the time of manufacture. In some cases, the address is determined when the conventional slave device is deployed by wiring address pads to a particular fixed voltage potential such as a ground voltage potential (i.e., ground) or a source voltage potential (e.g., source or $V_{DD}$). In still other cases, the address of the conventional slave device may be determined by combining a part of the address programmed or otherwise embedded at the time of manufacture with a different part of the address determined at the time of deployment via particular wiring of defined address pins (FIG. 1).

The inventors in the present case have determined that each address pad implemented on a slave device occupies valuable space and requires power, wiring, and other particular resources to implement, which in some cases is undesirable. In view of this recognition, the inventors have endeavored to reduce the amount of space and save such resources by implementing an additional and different addressing architecture into slave devices that operate within a local communications network such as the system 100 of FIG. 2.

In FIG. 2, each dynamically addressable slave device includes a single physical address configuration input (PACI) A. The single physical address configuration input A may be an address pad, a port, a connector, a pin, a junction, a wire-bond, or some other suitable structure. In other optional embodiments, one or more slave devices have a plurality of physical address configuration inputs (e.g., address pads A). In still other embodiments, one or more slave devices will have a single physical address configuration input A while one or more other devices will have two or more physical address configuration inputs.

In system 100 of FIG. 2, during an initialization stage and thereafter, the illustrated configuration provides a different slave address (i.e., a post-initialization slave address) for each of the slave devices 104, 106, 108, 110, even though each slave device has only a single physical address configuration input A. As illustrated, the physical address configuration input (PACI) A of the first slave device 104 is coupled to a first (fixed) voltage potential (i.e., 0 volts, ground, GND, or the like), the PACI A of the second slave device 106 is coupled to a second (fixed) voltage potential (i.e., 1.2 volts, 3.3 volts, 5 volts, or some other potential), the PACI A of the third slave device 108 is coupled to a third (changing) voltage potential (i.e., data line SDA 114), and the PACI A of the fourth slave device 110 is coupled to a fourth (changing) voltage potential (i.e., clock line SCL 112).

In system 100 of FIG. 2, the single physical address configuration input A arranged in each slave device permits up to four devices to each determine a unique address within the local communications network. In addition, the arrangement permits some or all of the slave devices to define their slave address dynamically. For each additional physical address configuration input A that is added to a slave device, the number of different possible address configurations of the slave device can be doubled again. That is, in the configuration of FIG. 2, a slave device with a single physical address configuration input A can take one of four unique addresses. A slave device with two physical address configuration inputs can take one of eight unique addresses, a slave device with three physical address configuration inputs can take one of sixteen unique addresses, and so on.

The definition of a slave address during an initialization stage of a system such as system 100 follows a defined sequence. The first communication on the multi-conductor bus (i.e., SCL 12 and SDA 14) communicates a particular code, which may have a defined fixed portion and an active portion. In FIG. 2, the active portion is processed as a bit that is the optionally negated value of a signal coupled to the particular physical address configuration input A. For example, a seven-bit binary address for the slave device may be defined after first receiving a set of six bits that are fixed (e.g., 111001B, 000111B, or some other value) and engaging in an active process upon receipt of a seventh bit. That is, the slave address can be determined by monitoring, during an initialization stage, the signal on the physical address configuration input A during the rising edge, the falling edge, or both the rising and falling edges of the SCL 112 line during some or all of the first eight periods of the SCL 112 line.

Considering a non-limiting embodiment of FIG. 2, master device 102 asserts a START condition on the SCL 112 and SDA 114 lines during an initialization stage, which is recognized by each slave device 104, 106, 108, 110. Subsequently, having recognized the START condition, each slave device monitors bits that are asserted by master device 102 on SDA 114 while clock pulses pass on SCL 112. If the asserted bits match a fixed portion of a pre-initialization address (e.g., 111001B, 000111B, or some other value), then each slave device 104, 106, 108, 110 will monitor the next active bit that is asserted by master device 102 on SDA 114. When the particular next active bit is received, each of the slave devices will then determine its own unique address that it will respond to after the initialization stage is complete. In this way, each slave device dynamically sets its own address during an initialization stage. Each slave device will have a pre-initialization address and a post-initialization address, and while some bits of the pre-initialization address may be the same as some bits in the post-initialization address, there is no such requirement, and the post-initialization address can be any desired value determined by a manufacturer, a systems integrator, a user, or by some other party.

Optionally, concurrent with, or after the dynamic self-addressing operation, one of the slave devices will assert an acknowledgement bit (ACK) on the data line SDA 114. For example, when the slave device where the fixed address bits match the fixed portion of a pre-initialization address and where the data bit received during the active portion of the pre-initialization address matches an actual signal, or in some cases an optionally inverted signal, on the physical address configuration input, then that slave device will assert the ACK bit. Other slave devices in this case will also set their own post-initialization slave address, but these other slave devices will not assert an ACK bit on SDA 114.

Considering the system of FIG. 2, several options may be implemented. For example, it is recognized that in some embodiments, the slave devices will have one fixed address bit, two fixed address bits, or some other number of fixed address bits. As another example, embodiments described herein include a fixed address portion having six fixed bits, but in other cases a different number of fixed address bits are contemplated. The present embodiments have also described operations wherein a certain number of fixed address bits are sent by the master device and then the fixed bits are followed by an active address bit. In this case, when the active address bit is received, each slave device will determine its own post-initialization address. It is understood, however, that the inventive concepts described herein do not require any such order. Instead, one or more active bits and one or more fixed bits may be passed by the master device in any particular order understood by both the master device and the slave devices. In the embodiments of FIG. 2, each slave device includes an inversion circuit (i.e., an inverter) coupled to the physical address configuration input, thereby inverting signals sensed on the physical address configuration input. The inversion circuit is optional.

In still other cases, it is understood that the dynamic addressing features described herein may be flexibly configured with a wide variety of timing and triggering. Slave devices may have a first address during a pre-initialization state and a second address during a post-initialization state. Alternatively slave devices may not have any address during the pre-initialization state, and the dynamic assignment of the post-initialization address will be performed based on some other signal such as the ACK sent by one slave device. Accordingly, a wide variety of mechanisms may be used to direct one or more slave devices to automatically arrange or rearrange their internal slave addresses to create a system-wide unique address for each device.

FIGS. 3A-3D are timing diagrams associated with each of the four dynamically addressable slave devices 104, 106, 108, 110, of system 100 of FIG. 2 during an address configuration sequence. Each of FIGS. 3A-3D illustrates processing in a respective slave device during the same nine illustrated clock pulses of the address configuration sequence. Stated differently, each timing diagram represents a communication of nine bits of data across the multi-conductor bus, which, according to an I2C protocol, represent seven address bits, a data direction bit (i.e., read or write) and an acknowledgement (ACK) or not-acknowledgement (NACK) bit. In the timing diagrams of FIGS. 3A-3D, a signal on the serial clock line SCL 112 (FIG. 2) is shown, a signal on the serial data line SDA 114 (FIG. 2) is shown, and a signal sensed on the physical address configuration input A (FIG. 2), which is also referred to as SAO in FIG. 3, is shown.

Figure 3A:
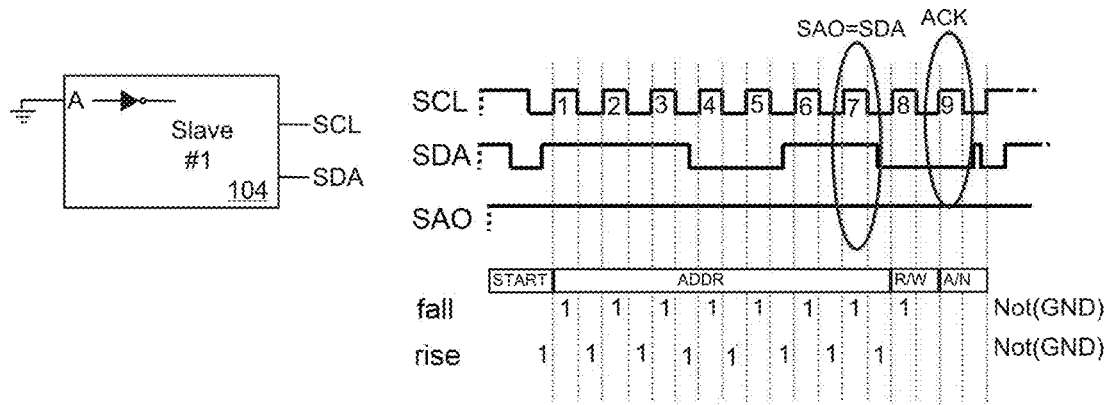
FIGS. 3A-3D are timing diagrams associated with each of the four dynamically addressable slave devices of the system of FIG. 2.

FIG. 3A illustrates an address configuration sequence for the first dynamically addressable slave device 104. In this exemplary non-limiting embodiment, for the sake of the present discussion, it is assumed that the first slave device 104 has a pre-initialization address of 0x73 hex, which is also represented in binary notation as 1110011B.

In FIG. 3A, prior to beginning a data transfer, a START condition is asserted on the multi-conductor bus by master device 102, which includes raising both the clock line SCL 112 and the data line SDA 114 HIGH, and while the SCL 112 is HIGH, releasing the SDA 114 line so that it falls LOW. The START condition is perceived by the first slave device 104 and each of the other slave devices 106, 108, 110 coupled to the multi-conductor bus. After the START condition, six data bits are passed concurrent with six clock pulses labeled 1-6. The six bits, which are passed on the serial data bus SDA 114, include the binary bits, 111001B. These first six data bits represent a fixed portion of the slave address of the first slave device 104, which may also be referred to herein as a first portion of an initial address, a pre-initialization address, a first address during a pre-initialization state, or a similar term. The final bit of the pre-initialization slave address of the first slave device 104, which may also be referred to as an "active bit," is passed on the seventh clock pulse. When the first slave device 104 recognizes the seventh clock pulse, the first slave device 104 will interrogate the signal on the physical address configuration input A, which is in this case inverted, and illustrated in FIG. 3A as signal SAO. Since the physical address configuration input A of slave device 104 is hard-wired to a fixed voltage potential (i.e., ground) and inverted, the signal SAO of slave device 104 is permanently asserted as a HIGH signal. Therefore, in this case, the slave device 104 has received six address bits (i.e., 111001B) and sensed a seventh address bit (i.e., 1B) to detect that the master device has passed 7 address bits (i.e., 1110011B) that match the pre-initialization address of the first slave device 104.

After the master device 102 sends the seven-bit slave address of the first slave device 104, the master device 102 then passes a data direction bit on the eighth clock pulse. The eighth bit (i.e., the data direction bit) is asserted LOW on the SDA 114 line to indicate a write operation; however, it is contemplated that such indication may differently indicate a read operation in other embodiments.

Subsequently, because the first slave device 104 has recognized its pre-initialization address in the address configuration sequence sent by the master device 102, the first slave device 104 will assert an ACK operation by driving the serial data line SDA 114 LOW during the ninth clock pulse.

In FIG. 3A, during the pre-initialization address recognition operation, the first dynamically addressable slave device 104 will set its own post-initialization address. That is, after the first slave device 104 recognizes the address asserted by the master device 102, the first slave device 104 will set the address that it will later respond to when it detects such address on the multi-conductor bus. In some cases, during the post-initialization state, the first address of the first slave device 104 (i.e., the pre-initialization address) and the second address of the first slave device 104 (i.e., the post-initialization address) are a same address (e.g., 1110011B in this example). In other cases, the first address and the second address are different addresses in the post-initialization state.

Figure 3B:
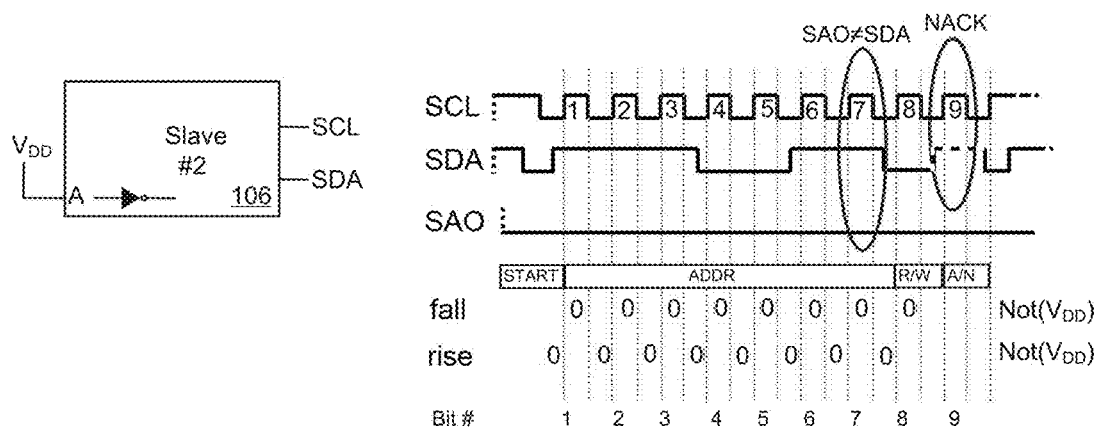

In FIG. 3B, processing in the second dynamically addressable slave device 106 during the nine clock pulses is considered. The START condition is recognized, address bits 1110011B are recognized on the serial data line SDA 114, and the read/write data direction bit is recognized concurrent with the seventh clock pulse. In this case, however, during communication of the address bits in connection with clock pulses 1-7, the second slave device 106 does not recognize the communicated data address because the physical address configuration input A is coupled to a fixed voltage potential (i.e., source, $V_{DD}$, or the like). When the seventh address bit is sent, the second slave device 106 will interrogate the signal on the physical address configuration input A, which is in this case inverted, and illustrated in FIG. 3B as signal SAO. Since the physical address configuration input A of slave device 106 is hard-wired to a fixed voltage potential (i.e., $V_{DD}$) and inverted, the signal SAO of slave device 106 is permanently asserted as a LOW signal. Therefore, in this case, even though the slave device 106 has received six matching address bits (i.e., 111001B), the seventh address bit (i.e., 0B) indicates no match of the pre-initialization address of the second slave device 106. Accordingly, during the ninth clock pulse, the second slave device 106 will assert a NACK condition by leaving the data line SDA 114 in an un-asserted (e.g., tri-stated, high impedance, etc.) state, which is indicated in FIG. 3B as a dashed pulse.

In the address configuration sequence of FIG. 3B, despite not recognizing the 7-bit address asserted by master device 102, the second dynamically addressable slave device 106 will still set its own post-initialization address. The trigger to set its post-initialization address may be realized by receiving seven address bits during an initialization stage, by matching some number of address bits during an initialization stage, by perceiving the ACK asserted by the first slave device 104 on the data bus SDA 114 during the ninth clock pulse, or by some other means. In each or any such case, the second slave device 106 will dynamically arrange a post-initialization stage address that it will respond to when commands bearing that address are asserted by the master device 102.

Figure 3C:
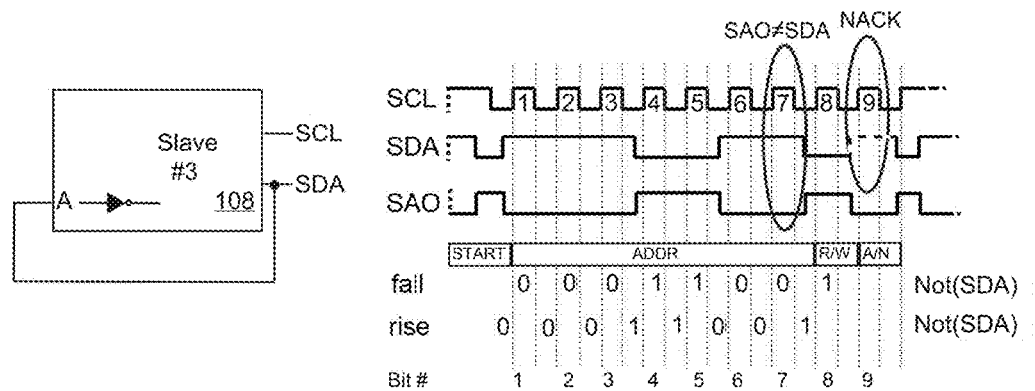
Figure 3D:
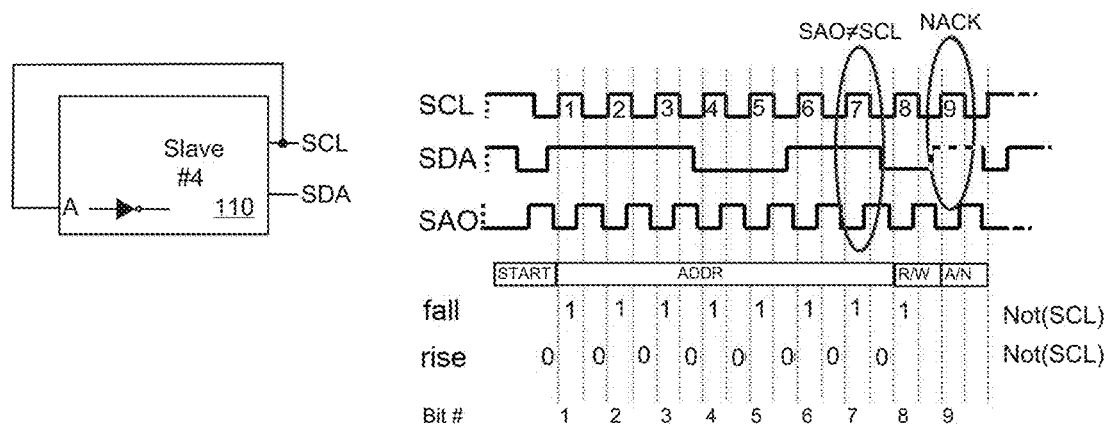

In FIGS. 3C and 3D, processing in a third dynamically addressable slave device 108 and a fourth dynamically addressable slave device 110 is along the lines of that described with respect to the second dynamically addressable slave device 106 and FIG. 3B. That is, a START condition is recognized, a six address bits are recognized during a first six clock pulses, a seventh address bit is not recognized during a seventh clock pulse, a data direction bit is recognized during an eighth clock pulse, and the data line SDA 114 is left un-asserted during a ninth clock pulse as indicated by a dashed line.

In FIGS. 3C and 3D, processing during the seventh clock pulse has different results than that shown in FIGS. 3A and 3B. The reason for the difference is caused by the different wiring of the physical address configuration input A in the third and fourth slave devices 108, 110, respectively. The third slave device 108 is configured with the physical address configuration input A coupled to the data line SDA 114, and the fourth slave device 110 is configured with the physical address configuration input A coupled to the clock line SCL 112. It is shown in these cases, that during the rising edge of the clock line and during the falling edge of the clock line, the signal on the physical address configuration input A will change depending on which changing voltage potential signal (i.e., SCL 112 or SDA 114) is coupled to the physical address configuration input A. In FIG. 3C, during the seventh clock pulse, the physical address configuration input A of the third slave device 108 changes from LOW to HIGH, and in FIG. 3D, during the seventh clock pulse, the physical address configuration input A of the fourth slave device 110 changes from HIGH to LOW. Based on this recognition, each of the third and fourth slave devices 106, 110, respectively will set a post-initialization slave address that is unique on the multi-conductor bus.

Considering the four illustrated slave devices 104, 106, 108, 110, and considering the corresponding timing diagrams of FIGS. 3A-3D, it is recognized that each of the slave devices has the ability to determine which of the four physical address configuration input A configurations it is wired with. That is, by using the same identical processing logic in each of slave devices 104, 106, 108, 110 (i.e., monitoring address bits and monitoring the state of the physical address configuration input A during one or both edges of a particular clock pulse), then each of the four slave devices 104, 106, 108, 110 can determine how its own particular physical address configuration input A is wired. Generally speaking, in reference to FIG. 2, each dynamically addressable slave device 104,106, 108, 110 can determine if its physical address configuration input A is wired to a fixed voltage potential or a changing voltage potential, and more specifically, each slave device 104,106, 108, 110 can determine if its physical address configuration input A is wired to ground, $V_{DD}$, clock line SCL 112, or data line SDA 114. Based on this determination, each of slave devices 104, 106, 108, 110, can set for itself a unique slave address within the multi-conductor bus protocol.

FIGS. 4A-4B are command and state tables representing operations of the address configuration sequence logic arranged within the dynamically addressable slave devices of FIG. 2. That is, each of slave devices 104, 106, 108, 110 has particular address configuration sequence (ACS) logic that among other things is also used to determine when an initialization stage is entered and exited, detect clock pulse edges on the clock line SCL 112, count clock pulses, monitor and sense data on the data line SDA 114, monitor and sense data on a physical address configuration input A, compare received address bits with internally retrieved or fixed address bits, and set a post-initialization address. The ACS logic may be implemented exclusively or in part by any type of processing logic such as a state machine, a processor or other controller that executes software instructions, combinatorial gating logic (e.g., AND, OR, XOR, etc.), one or more lookup tables, a user interface, non-volatile memory, and the like.

The command and state table of FIG. 4A is relevant to system 100 of FIG. 2 and an address configuration sequence wherein a HIGH logic state (i.e., 1B) is transmitted as the seventh bit of the slave address during an initialization stage. In the table of FIG. 4A, the physical address configuration input (PACI) A of slave device 104 is coupled to ground (i.e., Row 1 of the table in FIG. 4A), the PACI of slave device 106 is coupled to $V_{DD}$ (i.e., Row 2 of the table in FIG. 4A), the PACI of slave device 108 is coupled to data line SDA 114 (i.e., Row 3 of the table in FIG. 4A), and the PACI of slave device 110 is coupled to clock line SCL 112 (i.e., Row 4 of the table in FIG. 4A). In the second and third columns of the table of FIG. 4A, the state of the physical address configuration input A for each slave device is recorded during the falling edge of the clock line SCL 112 and during the rising edge of the clock line SCL 112. In the table of FIG. 4A, which also corresponds to the figures and descriptions of FIGS. 3A-3D, it is represented that the first slave device 104 recognizes the slave address asserted by the master device 102, and the second, third, and fourth slave devices 106, 108, 110 do not recognize the slave address asserted by the master device 102. For this reason, as indicated in the first row and fourth column of the table in FIG. 4A, the first slave device 104 is the only slave device to assert an ACK signal on the data line SDA 114.

Different from FIG. 4A, the command and state table of FIG. 4B is relevant to system 100 of FIG. 2 and an address configuration sequence wherein a LOW logic state (i.e., 0B) is transmitted as the seventh bit of the slave address during an initialization stage. In this case, the signals on the physical address configuration input A of the third and fourth slave devices 108, 110, represented in the third and fourth rows of the table in FIG. 4B, are distinguished from corresponding rows in the table of FIG. 4A. In addition, it is the second slave device 106, wherein the physical address configuration input A of the second slave device 106 is electrically coupled to $V_{DD}$, that recognizes the slave address asserted by the master device 102 on the data line SDA 114. For this reason, the second slave device 106 asserts an ACK signal on the data line SDA 114 during a ninth bit of the address configuration sequence.

As illustrated by the data in the tables of FIGS. 4A and 4B, after the transmission of the first byte by the master device 102, having monitored all communications, each slave device 104, 106, 108, 110 is able to determine exactly which configuration it has and modify accordingly its slave address for all subsequent communication.

Figure 5:
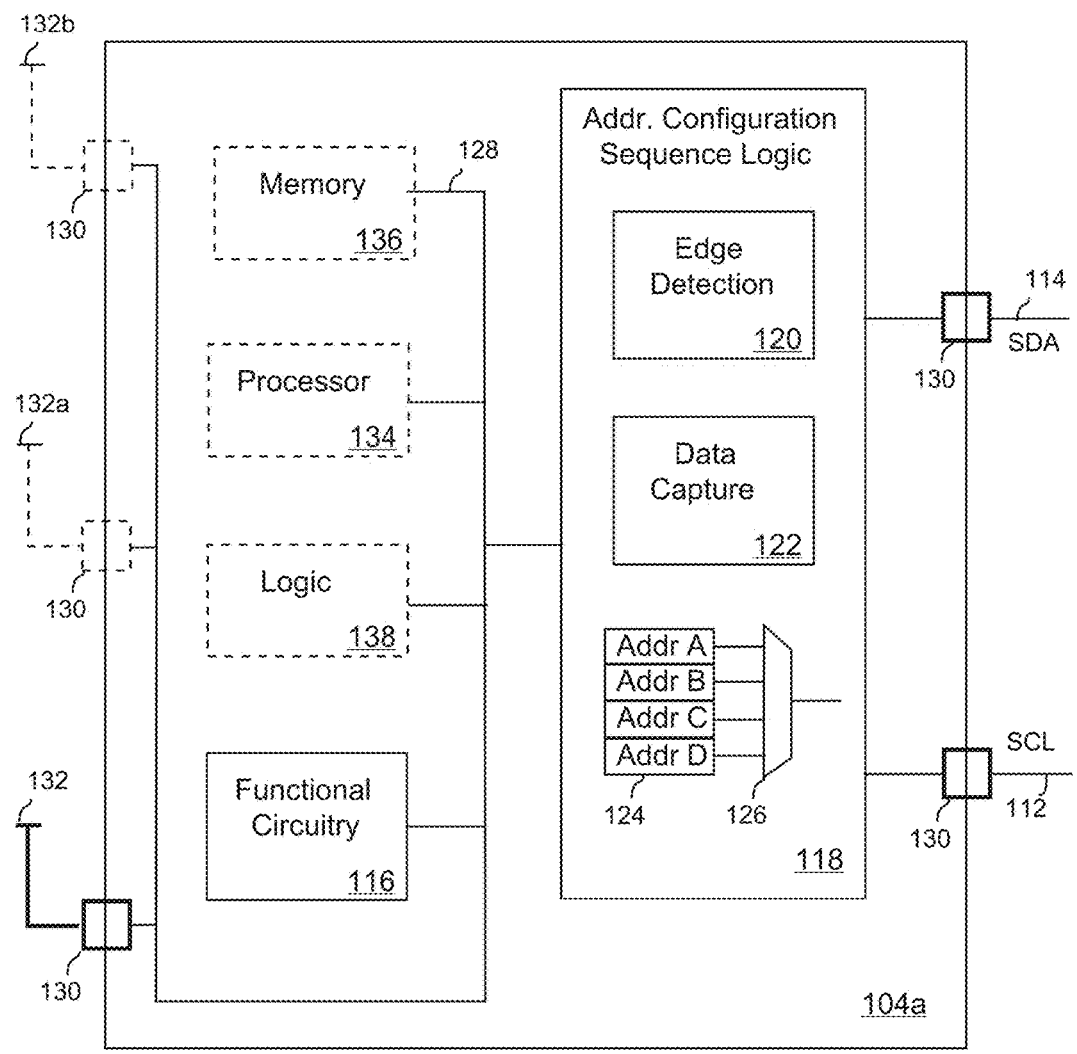
FIG. 5 is an exemplary dynamically addressable slave device embodiment.

FIG. 5 is an exemplary dynamically addressable slave device 104*a* embodiment in more detail. The exemplary slave device 104*a* may be identical to one or all of slave devices 104, 106, 108, 110 of FIGS. 2 and 3A-3D. The exemplary slave device 104*a* includes functional circuitry 116 which carries out a particular functionality of the exemplary slave device 104*a*. For example, if the exemplary slave device 104*a* is a microphone, then functional circuitry 116 may include microphone circuitry such as electromagnetic pickup circuitry, amplifier circuitry, filtering circuitry, sampling circuitry, and the like. If the exemplary slave device 104*a* is a motion sensor, then functional circuitry 116 may include micro-electromechanical systems (MEMS) drive and signal capture circuitry, filtering circuitry, amplifier circuitry, and the like. For simplicity in the specification, other functional circuits are not described in detail, but such other functional circuits are clearly contemplated.

The exemplary slave device 104*a* also includes address configuration sequence logic 118. The address configuration sequence (ACS) logic 118 includes an edge detection circuit 120, a data capture circuit 122, a slave address repository 124, and a slave address selection circuit 126. The ACS logic 118 and the functional circuitry 116, along with other circuitry of the slave device 104, are coupled by internal communication circuitry 128, which may be formed by one or more busses, memory pointers, or some other logic.

The exemplary dynamically addressable slave device 104*a* of FIG. 5 includes an interface to a multi-conductor bus, which may follow an I2C protocol or some other protocol, and which further may include a conduit for the data line SDA 114 and a conduit for the clock line 112. Input/output circuitry of the exemplary slave device 104*a* may include any number of electrical connection points 130, which may each be formed as or including a pad, a pin, a node, a wire bond, or some other suitable physical structure. It is recognized, however, that in at least some cases, it is desirable to reduce the number of electrical connection points 130 integrated into an exemplary slave device 104*a*.

The exemplary dynamically addressable slave device 104*a* in FIG. 5 is shown with a particular physical address configuration input 132, which may be electrically coupled to a fixed ground potential, a fixed source potential (e.g., $V_{DD}$), a changing data line SDA 114, or a changing clock line SCL 112 along the lines of the dynamically addressable slave devices 104, 106, 108, 110 in FIG. 2. In this way, if each of four identical slave devices is differently wired to one of the four signals, then each of the four exemplary slave devices 104*a* may recognize its configuration using the internal ACS logic 118, and the ACS logic 118 will select a post-initialization slave address that corresponds to the particular one of four wiring configurations.

The exemplary dynamically addressable slave device 104*a* in FIG. 5 may optionally have a plurality of physical address configuration inputs. For example, physical address configuration input 132*a* and physical address configuration input 132*b* are also represented in FIG. 5, however, any number of physical address configuration inputs are contemplated. As taught herein, a single physical address configuration input 132 may be configured in four different ways as shown in FIG. 2, and thus, up to four slave devices may be uniquely addressed. Adding a second physical address configuration input 132*a* would permit up to eight slave devices to be uniquely addressed, and adding a third physical address configuration input 132*b* would permit up to sixteen slave devices to be uniquely addressed. In this way, by adding additional physical address configuration inputs, an increased number of slave devices may be uniquely addressed.

The exemplary slave device 104*a* may optionally include a processor 134, one or more memory devices 136, and other processing logic 138. The processor 134 may execute software instructions retrieved from the one or more memory devices 136 in order to direct operations of the functional circuitry 116, in order to direct operations of the address configuration sequence logic 118, or for other purposes of the exemplary slave device 104*a*. The processing logic 138 may include any number of optional circuits such as a user interface, a power supply, various timing circuitry, state machine circuitry, or the like.

Figure 6:
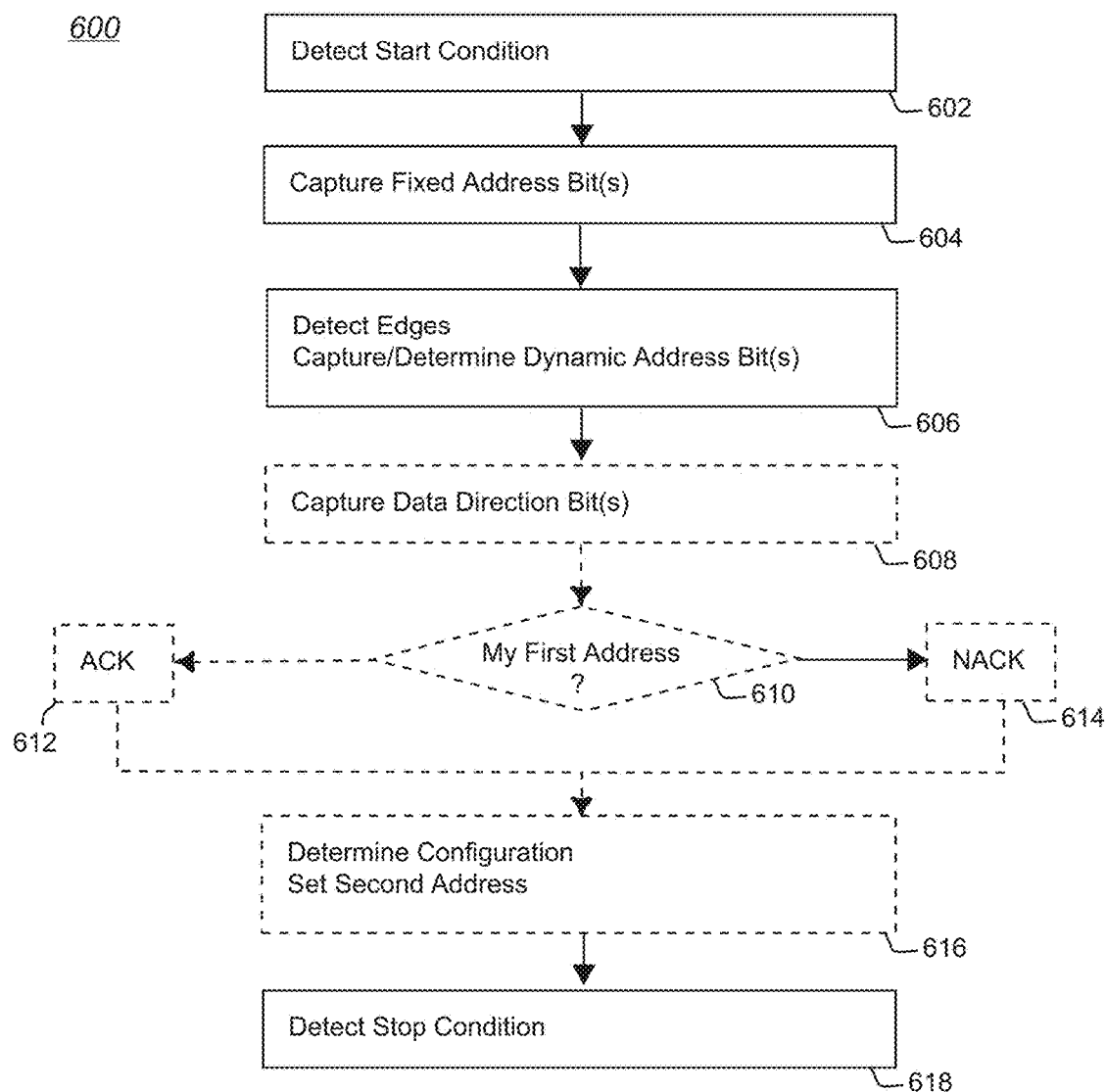
FIG. 6 is an address configuration sequence logic flow diagram.

The operations of the exemplary state device 104*a*, and in particular the operations of the address configuration sequence logic 118, are described in association with the exemplary address configuration sequence logic flow diagram of FIG. 6.

FIG. 6 is an address configuration sequence logic flow diagram 600 illustrating operations in a slave device such as any one or more of dynamically addressable slave devices 104, 106, 108, 110 of FIGS. 2, 3A-3D, 4A-4B, which may each be embodied as the exemplary slave device 104*a* of FIG. 5. Processing begins at 602 in the exemplary slave device 104*a*, which is waiting (e.g., an IDLE state) for a START condition to be asserted on the multi-conductor bus (e.g., in an I2C protocol, raising both the clock line SCL 112 and the data line SDA 114 HIGH, and while SCL 112 is HIGH, releasing SDA 14 so that it falls LOW). Prior to detecting the START condition at 602, the exemplary slave device 104*a* will typically be ignoring all of the signals that are asserted on the multi-conductor bus.

At the time processing begins at 602, each slave device is in a pre-initialization stage or an active initialization stage. The initialization stage typically occurs after a device power-on operation, but the initialization stage may also occur at different times. The initialization stage may be indicated by a value stored in a register or other location of memory 136, by a different status signal (not shown), by a known first address of the respective slave device, by a difference between data in a first address repository and a second address repository, or by some other means. For example, each slave device will respond to commands sent by a master device in which an address (e.g., a specific bit sequence) is included in the command. Before the initialization stage is complete, each slave device will have a "first address," and after the initialization stage is complete, each slave device will have a "second address." In many cases, the second address will be different from the first address, though in at least one case, the first address and the second address in one of the slaves on a bus will be the same and not change.

After detecting a START condition, processing of the exemplary slave device 104a passes to 604 where, optionally, one or more "fixed" address bits are captured, and processing passes to 606 where based on the detection of one or more edges, one or more "dynamic" address bits are captured or otherwise determined.

The present disclosure describes the communication of "fixed" address bits and "dynamic" address bits. These address bit descriptions are used to better explain the inventive dynamic addressing concepts set forth herein, but the distinction between such address bits is made merely to distinguish one or more particular events that trigger certain processing within each exemplary slave device 104a. That is, in the concept of some I2C protocols, a master device asserts a seven-bit address on a bus in order to uniquely identify one of a plurality of slave devices coupled to the bus. For this reason, the present disclosure describes each exemplary slave device as capturing a first number of address bits (i.e., bits 1-6), which are referred to as "fixed," and then undertaking a dynamic addressing process after capturing a second number of address bits (i.e., bit 7), which are referred to as "dynamic." In this way, one expressly identified exemplary slave device 104a can respond to the master device by asserting an ACK condition, which each exemplary slave device 104a that is coupled to the bus carries out its own dynamic addressing process.

The processing at 604 and 606 is referred to as "optional" because the particular order of processing may be changed, and because in some embodiments, no fixed address bits are captured. That is, even though the discussion herein generally describes a seven-bit address as including six fixed bits and a seventh dynamic bit, the inventive concepts described herein do not require such explicit formatting. For example, in some embodiments, one or more dynamic bits are passed before or in between one or more fixed bits. In some other embodiments, no fixed bits at all are passed and instead, only one or more dynamic bits are passed. In each embodiment, however, each exemplary slave device 104a coupled to a bus is triggered at a determined time, by a selected condition (e.g., when a seventh address bit is received) to perform its own dynamic addressing procedure.

Notwithstanding the optional characteristics described herein, the remainder of the discussion associated with the address configuration sequence logic flow diagram 600 is directed to the slave devices of FIGS. 2, 3A-3D, 4A-4D, and 5, wherein a master device communicates a seven-bit address during an initialization stage to each slave device, and wherein each slave device determines its own wiring configuration (i.e., wiring of a physical address configuration input) and based on said wiring configuration, each slave device sets its own post-initialization address. In even further summary, at a time of initialization, such as concurrent with a power-on operation, each slave device has a first address, which is a pre-initialization address. Then, during the initialization, each slave device sets its own second address, which is a post-initialization address. Subsequently, after the initialization process carried out by each slave device, the master device will communicate with each slave device using the respective slave device's second address.

Turning back to processing at 604 and 606, a master device passes six fixed bits and one dynamic bit to each slave device on a bus, such as the exemplary dynamically addressable slave device 104a of FIG. 5. The first six bits may be captured and stored, for example in memory 136, or the first six bits may be immediately compared to the first six bits of a first address of the respective slave device. If the address bits that are received on the bus are serially (i.e., immediately) compared to corresponding bits of the first address, then after a failed comparison, the slave device may optionally exit its initialization process and again wait at 602 to detect a new START condition. Alternatively, if the first six bits are stored, then processing falls from 604 to 606.

The first address of the slave device, which is the address of the slave device before the initialization stage completes, may be stored in memory 136, hard-wired in logic 138, or determined in the slave device in a different way. In some embodiments, the slave device includes a processor 134, memory 136, and logic 138, which cooperate to permit storage of a first address in memory 136. The storage of a first pre-initialization address in the slave device may be programmatic, via a user interface, or by some other means.

At 606, during the time a dynamic (i.e., seventh) address bit is received by the slave device, the slave device will perform one or more data capture operations triggered by the detection of one or more edges on certain signals.

An edge detection circuit 120 in the exemplary slave device 104a may be electrically coupled to one or more signal lines that are available within the exemplary slave device 104a. For example, the edge detection circuit 120 may be electrically coupled to one or more electrical coupling points 130, and using this coupling, the edge detection circuit 120 can monitor and determine (i.e., "detect") various logic states, rising edges, falling edges, and the like of the data line SDA 114, the clock line SCL 112, the physical address configuration inputs 132 and 132a, 132b, and the like. In some cases, the edge detection circuit 120 includes one or more Schmitt Trigger circuits, one or more inverter circuits serially coupled to one input of a multi-input gate (e.g., AND gate, NOR gate, or the like), cascaded latches or flip-flops with opposing enable circuits in a master-slave relationship, or another edge detection circuit.

A data capture circuit 122 may be formed using any or all of registers, memory, flip-flops, latches, or the like. For example, in some cases, a data capture circuit 122 includes two or more D flip-flops having respective clock inputs coupled to the edge detect circuit. The D input to each flip-flop may, for example, be electrically coupled to the physical address configuration input (PACT) 132 such that, on a rising edge of the clock line SCL 112, a first D flip-flop captures the state of the PACI 132, and on the falling edge of the clock line 112, a second D flip-flop captures the state of the PACI 132. If the edge detection circuit 120 and data capture circuit 122 are so directed (e.g., by processor 134, logic 138, or some other means) during the receipt of the seventh address bit, then the slave device can determine how its particular PACI 132 line is wired. See, for example, dynamically addressable slave devices 104, 106, 108, 110, of FIG. 2, the wiring diagrams of FIGS. 3A-3D, the tables of FIGS. 4A-4B, and the associated discussion of said figures.

In FIG. 6, the processing at 608, 610, 612, 614, and 616 is shown in dashed lines to indicate that the order of such processing is not strict. That is, in some embodiments, the processing at 616 occurs timely with the processing at 606 and before the processing at 608. In some embodiments, the processing of 610 may occur in correspondence with the processing of 606 or 616, though the processing at 612 and 614 will generally occur after the processing of 608. Other processing in other embodiments may be differently ordered without departing from the inventive concepts described herein.

At 608, an eighth bit sent by the master device is a data direction bit, and at 610, the particular slave device determines if the address passed by the master device is the same as a first address (i.e., an address of the slave device before an initialization stage completes). If the seven bits of the address sent by the master device match the seven bits of the first address of the slave device, then processing in the slave device passes to 612 and the slave device asserts an ACK condition on the bus, and alternatively, if the address sent by the master device does not match the first address of the slave device, then processing in the slave device passes to 614 and the slave device asserts (i.e., floats, tri-states, and the like) a NACK condition on the bus.

In some cases, the ACK condition asserted on the bus indicates to the master device that the initialization stage of the slave devices is complete, and the master device can subsequently use a second address to communicate with each slave device. In some cases, each slave that does not recognize the first address sent by the master device detects the ACK condition asserted by a slave device that does recognize the first address using, for example, the edge detection circuit 120 and the data capture circuit 122. In these cases, the slave devices that detect the ACK condition use the detection as a trigger to configure their own second address.

In processing at 616, each slave device coupled to the bus will determine its own configuration and set its own second address. As discussed herein, the processing of 616 may be triggered by recognition of the first six bits of a device address passed by the master device, by recognition of the ACK condition asserted by one of the slave devices, or by some other means. Also as discussed herein, the configuration determined by each slave device corresponds to the wiring of one physical address configuration input, or more if such PACI's are present, using the edge detection circuit 120 and the data capture circuit 122. Considering the PACI 132 of FIG. 5, for example, if the PACI 132 is wired to a ground potential, then the slave device will select one second address, and if the PACI 132 is wired to a source (e.g., $V_{DD}$) potential, then the slave device will select a different second address. If the PACI 132 is wired to the data line SDA 114, then the slave device will select yet another second address, and if the PACI 132 is wired to the clock line 112, then the slave device will select still one other different second address.

The selection of the second address may be made by a lookup table, a memory device, a processor executing software instructions, a state machine, combinatorial gating logic, hard-wiring, or some other means. In one exemplary case, a particular set of second addresses is stored in a slave address repository 124, which may be a set of registers or some other memory, and a determined one of the second addresses is passed and available to the slave device via a slave address selection circuit 126, which may be a multiplexer or some other circuit.

Considering an exemplary case of processing at 616, a system 100 includes four slave devices 104, 106, 108, 110, respectively having a physical address configuration input A wired to ground, $V_{DD}$, SDA 114, and SCL 112. See FIG. 2. Each of the four slave devices is identically configured as illustrated in the exemplary slave device 104a of FIG. 5. In the embodiment, each slave device includes a memory, which may be configured as the slave address repository 124. Each slave device may further include logic 138, the processor 134, and memory 136, a state machine, hard-wiring, or some other means to implement the processing represented in Table 2.

TABLE 2

Dynamic Slave Device Address Configuration

| PACI Wiring Configuration | First Address | Second Address |
|---|---|---|
| GROUND | 1110010B | 0110001B |
| $V_{DD}$ | 1110011B | 0110010B |
| SDA 114 | 111001xB | 0110011B |
| SCL 112 | 111001xB | 0110100B |

In the processing at 616, it is presumed that the master device and all of the slave devices 104, 106, 108, 110 are operating in an initialization stage. It is further presumed that the master device has started an address configuration sequence wherein a START condition is asserted, a seven-bit first address (i.e., 0x73H, which is 1110011B) is asserted, and a data direction bit is asserted. Each of the four slave devices 104, 106, 108, 110, has recognized the first six bits of the slave address, but only the first slave device 104 has recognized the seventh address bit, which in this case is inverted due to the presence of the optional inversion circuitry (FIG. 2). Accordingly, the first slave device 104 has asserted an ACK condition on the bus and the second, third, and fourth slave devices 106, 108, 110, respectively, have asserted or otherwise permitted a NACK condition on the bus.

At 616, the first slave device 104 has determined that its physical address configuration input (PACI) input is coupled to GROUND, so the first slave device 104 sets its second address to 0x31H, which is 0110001B. After the initialization stage is complete, the first slave device 104 will act on and respond to commands that are directed toward slave address 0110001B. In one case, the second address 0110001B is stored as Addr A in the slave address repository 124, and the slave address selection circuit 126 is arranged in the first slave device 104 to select Addr A in the slave address repository.

Also at 616, the second slave device 106 has determined that its PACI input is coupled to $V_{DD}$. Thus, the second slave device 106 sets its second address to 0x32H, which is 0110010B. In the second slave device 106, after the initialization stage is complete, commands will be acted on and responded to when the commands are directed toward slave address 0110010B. In one case, the second slave address 0110010B is stored as Addr B in the slave address repository 124, and the slave address selection circuit 126 is arranged in the second slave device 106 to select Addr B in the slave address repository 124.

Correspondingly, in processing at 616 in the third slave device 108, the wiring of the PACI to SDA 114 causes setting of the address to 0x33H, which is 0110011B. Also along these lines, the second slave address in the third device 108 (i.e., 0110011B) may be stored as Addr C in the slave address repository 124, and the slave address selection circuit 126 may be arranged to select Addr C in the slave address repository 124.

Further, in processing at 616 in the fourth slave device 110, the wiring of the PACI to SCL 112 causes setting of the second address to 0x34H in the fourth slave device 110, which is 0110100B. The second slave address in the fourth device 110 (i.e., 0110100B) in some embodiments may be stored as Addr D in the slave address repository 124, and the slave address selection circuit 126 may be arranged to select Addr D in the slave address repository 124.

It is noted that in at least one case of alternate processing when the PACI of a particular slave device is wired in such a way that the slave device asserted by the master device on the bus matches the slave device represented by the first address, then that particular slave device may arrange its second address to be the same as the first address. This alternate processing may be included in each slave device since each slave device will wire its own PACI in a unique way (e.g., ground, source, SDA, SCL).

After processing at 616, or particularly after processing to assert either an ACK or NACK condition by the slave devices, a particular STOP condition may be asserted on the bus in processing at 618. The processing at 618 in some cases will signal the end of the initialization stage, which may in some cases be called a post-initialization stage. Processing of the sequence logic flow diagram 600 ends after 618.

Figure 7:
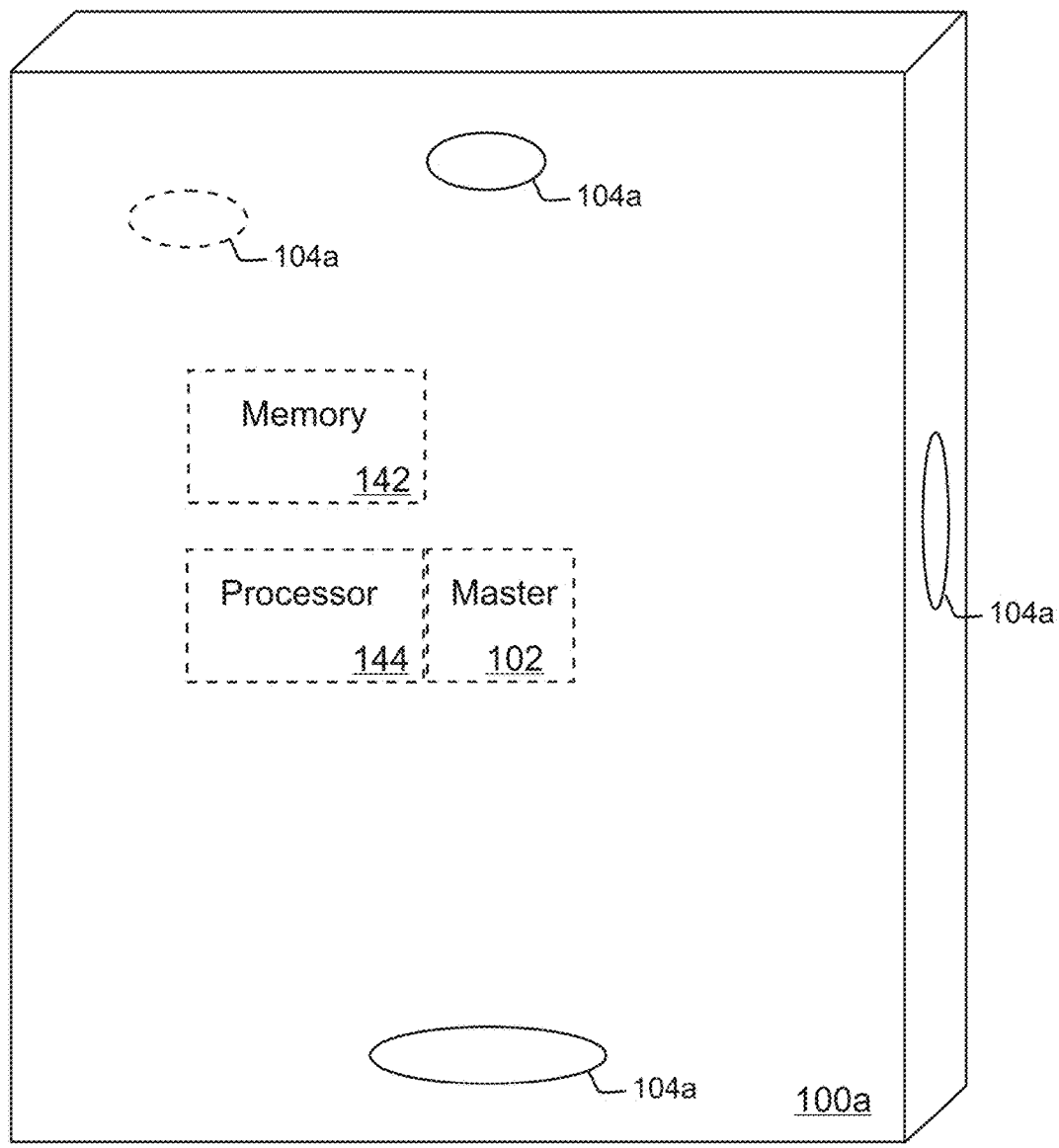
FIG. 7 is an exemplary mobile device embodiment.

FIG. 7 is an exemplary mobile device embodiment 100a. The mobile device 100 may be understood as corresponding to the system 100 of FIG. 2 having dynamically addressable slave devices 104, 106, 108, 110, that are arranged as the exemplary slave device 104a of FIG. 5.

In many electronic devices, such as the mobile device 100a, an applications processor 144 receives data from, and provides commands to, various electronic peripherals. For example, in mobile device 100a, which may be a smartphone, a main applications processor 144 communicates via a two-conductor bus that conforms to an INTER-INTEGRATED CIRCUIT (I2C) protocol. The applications processor 144, according to software instructions in a memory 142, has an integrated or otherwise available and cooperative I2C master controller 102 that directs operations in a plurality of slave devices such as microphones, motion sensors, temperature sensors, memory devices, time of day and real-time counting clocks, and the like. In these configurations, the master processor communicates across the I2C bus with slave devices that are also coupled to the I2C bus.

In some cases, each of slave devices 104a of the mobile device 100a is an identical microphone device. The manufacturer of the mobile device 100a wires a first one of the slave devices 104a to a ground potential, a second one of the slave devices 104a to a source potential, a third one of the slave devices 104a to a clock line, and a fourth one of the slave devices 104a to a data line.

During an initialization stage, the master device 102 asserts a seven-bit address sequence that is detected and captured by each slave device 104a. All or at least a portion of the bits of the seven-bit address sequence are recognized as a first address sequence of bits by each slave device. During communication of another one of the bits of the first address sequence by the master (e.g., the seventh bit), a data capture circuit in each slave device is arranged to recognize a first voltage potential, a second voltage potential, or the first voltage potential and the second voltage potential on the physical address configuration input when at least one clock edge is detected by an edge detection circuit. This data captured by the data capture circuit is used to select the second address that the slave device will respond to in subsequent post-initialization communications with the master device 102. The second address, which may also be called a post-initialization address, may be retrieved from a lookup table or by some other means.

In this case, it is recognized that the manufacturer of the mobile device 100a has integrated four identical slave devices 104a (e.g., microphones) into the mobile device 100a. A first microphone is on the front of the mobile device 100a at the top, a second microphone is on the front of the mobile device 100a at the bottom, a third microphone (i.e., the slave device 104a shown in dashed lines) at the back of the mobile device 100a, and a fourth microphone at the side of the mobile device 100a. Each microphone has a single physical address configuration input (PACT) wired to one of ground, $V_{DD}$, SCL, and SDA, and the manufacturer also knows which microphone wires its PACI to which fixed or changing voltage potential. Accordingly, by using this knowledge of PACI wiring, the manufacturer or a systems integrator of the mobile device 100a can also know what address will be assigned to each of the four microphones. The manufacturer can know this by also knowing how a lookup table in each microphone is formed, loaded, or otherwise implemented, or by other corresponding knowledge of the address configuration sequence carried out by each microphone during initialization.

The multi-conductor bus described herein may include two or more conductors such as wires or some other medium configured to pass logical signals (e.g., logical high value, logical low value, binary 1 value, binary 0 value, $V_{DD}$, GND, and the like). In the present disclosure, embodiments are described with respect to an I2C protocol. Nevertheless, it is contemplated that the principles and teaching of the present application may also be applied to other protocols without departing from the inventive features described herein. These other protocols may include, without limitation, non-I2C proprietary protocols, certain one-wire protocols, certain two-wire protocols, certain three-wire protocols, certain wireless protocols, a Serial Peripheral Interface (SPI) protocol, a System Management Bus (SMBus) protocol, a Power Management Bus (PMBus) protocol, an ACCESS-.bus protocol, Display Data Channel (DDC) protocol, Enhanced DDC protocol, CBUS, and the like.

A processor (i.e., a processing unit), as used in the present disclosure, refers to one or more processing units individually, shared, or in a group, having one or more processing cores (e.g., execution units), including central processing units (CPUs), digital signal processors (DSPs), microprocessors, micro controllers, state machines, and the like that execute instructions.

In the present disclosure, memory may be used in one configuration or another. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

The terms, "real-time" or "real time," as used herein and in the claims that follow, are not intended to imply instantaneous processing, transmission, reception, or otherwise as the case may be. Instead, the terms, "real-time" and "real time" imply that the activity occurs over an acceptably short period of time (e.g., over a period of microseconds or milliseconds), and that the activity may be performed on an ongoing basis. An example of an activity that is not real-time is one that occurs over an extended period of time (e.g., hours or days)] or that occurs based on intervention or direction by a person or other activity.

Memory 136 and in some cases other memory in a slave device and master device comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, a flash memory device, a CD-ROM, and/or the like.

FIG. 6 is a flow diagram illustrating processes that may be used by embodiments of the slave devices described herein. In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems, as well as networks and busses have not been shown or described in detail to avoid unnecessarily obscuring descriptions of the embodiments.

Certain words and phrases used in the specification are set forth as follows. Unless the context requires otherwise, throughout the specification and claims which follow, the word "comprise" and variations thereof, such as, "comprises" and "comprising," are to be construed in an open, inclusive sense, e.g., "including, but not limited to." The term "include," as well as derivatives thereof, means inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Those of ordinary skill in the art will understand that in many, if not most instances, such definitions apply to prior as well as future uses of such defined words and phrases.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

When so arranged as described herein, each computing device may be transformed from a generic and unspecific computing device to a combination device comprising hardware and software configured for a specific and particular purpose.

The headings and Abstract of the Disclosure provided herein are for convenience only and do not limit or interpret the scope or meaning of the embodiments.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a multi-conductor bus having a clock line and a data line;
a master device coupled to the multi-conductor bus and arranged to transmit an address configuration sequence; and
a first slave device coupled to the multi-conductor bus and having a physical address configuration input, the first slave device being arranged to configurably set an address of the first slave device based on the address configuration sequence and on whether the physical address configuration input of the first slave device is coupled to a fixed voltage potential or to one of the clock line and data line, wherein the physical address configuration input is coupled to a source voltage terminal and the first slave device arranged to determine from the address configuration sequence that the physical address configuration input of the first slave device is coupled to the source voltage terminal and set the address of the first slave device based on determining that the physical address configuration input of the first slave device is coupled to the source voltage terminal.

2. A system, comprising:
a multi-conductor bus having a clock line and a data line;
a master device coupled to the multi-conductor bus and arranged to transmit an address configuration sequence; and
a first slave device coupled to the multi-conductor bus and having a physical address configuration input, the first slave device being arranged to configurably set an address of the first slave device based on the address configuration sequence and on whether the physical address configuration input of the first slave device is coupled to a fixed voltage potential or to one of the clock line and data line, wherein the physical address configuration input is coupled to a ground terminal and the first slave device arranged to determine from the address configuration sequence that the physical address configuration input of the first slave device is coupled to the ground terminal and set the address of the first slave device based on determining that the physical address configuration input of the first slave device is coupled to the ground terminal.

3. A system comprising:
a multi-conductor bus having a clock line and a data line;
a master device coupled to the multi-conductor bus and arranged to transmit an address configuration sequence; and
a first slave device coupled to the multi-conductor bus and having a physical address configuration input, the first slave device being arranged to configurably set an address of the first slave device based on the address configuration sequence and on whether the physical address configuration input of the first slave device is coupled to a fixed voltage potential or to one of the clock line and data line, wherein the first slave device includes a data line input connected to the data line, the physical address configuration input is coupled to the data line input, and the first slave device arranged to determine from the address configuration sequence that the physical address configuration input of the first slave device is coupled to the data line input and set the address of the first slave device based on determining that the physical address configuration input of the first slave device is coupled to the data line input.

4. A system comprising:
a multi-conductor bus having a clock line and a data line;
a master device coupled to the multi-conductor bus and arranged to transmit an address configuration sequence; and
a first slave device coupled to the multi-conductor bus and having a physical address configuration input, the first slave device being arranged to configurably set an address of the first slave device based on the address configuration sequence and on whether the physical address configuration input of the first slave device is coupled to a fixed voltage potential or to one of the clock line and data line, wherein the first slave device includes a clock line input connected to the clock line and the first slave device is configured to determine from the address configuration sequence that the physical address configuration input is connected to the clock line input and set the address of the first slave device based on determining that the physical address configuration input of the first slave device is coupled to the clock line input.

5. A system comprising:
a multi-conductor bus having a clock line and a data line;
a master device coupled to the multi-conductor bus and arranged to transmit an address configuration sequence; and
a first slave device coupled to the multi-conductor bus and having a physical address configuration input, the first slave device being arranged to configurably set an address of the first slave device based on the address configuration sequence and on whether the physical address configuration input of the first slave device is coupled to a fixed voltage potential or to one of the clock line and data line, wherein the physical address configuration input of the first slave device is coupled to a voltage source terminal, the system further comprising:

a second slave device having a physical address configuration input coupled to a ground terminal;
a third slave device having a clock line input connected to the clock line and a physical address configuration input coupled to the clock line input; and
a fourth slave device having a data line input connected to the data line and a physical address configuration input coupled to the data line input.

6. The system according to claim 1, wherein the address configuration sequence follows an INTER-INTEGRATED CIRCUIT (I2C) protocol.

7. A system comprising:
a multi-conductor bus having a clock line and a data line;
a master device coupled to the multi-conductor bus and arranged to transmit an address configuration sequence; and
a first slave device coupled to the multi-conductor bus and having a physical address configuration input, the first slave device being arranged to configurably set an address of the first slave device based on the address configuration sequence and on whether the physical address configuration input of the first slave device is coupled to a fixed voltage potential or to one of the clock line and data line, wherein the first slave device includes:
an edge detection circuit coupled to the clock line;
a data capture circuit coupled to the data line; and
a slave address selection circuit configured to set the address of the first slave device based on inputs from the edge detection circuit and the data capture circuit.

8. An address configuration method, comprising:
receiving, during an initialization stage from a multi-conductor bus, an address configuration sequence at a first device that has a clock line input, a data line input, and a physical address configuration input;
capturing data on the physical address configuration input;
determining from the captured data and the address configuration sequence whether the physical address configuration input is coupled to a fixed voltage potential, the clock line input, or the data line input;
setting a post-initialization address of the first device based on the determining of whether the physical address configuration input is coupled to a fixed voltage potential, the clock line input, or the data line input; and
after the initialization stage, responding with the first device to commands passed on the multi-conductor bus that include the post-initialization address, wherein setting the post-initialization address of the first device comprises retrieving the post-initialization address from a lookup table on the first device.

9. The address configuration method according to claim 8, wherein the determining includes:
determining the physical address configuration input is coupled to a ground line.

10. The address configuration method according to claim 8, wherein the determining includes determining that the physical address configuration input of the first device is coupled to a source voltage terminal.

11. The address configuration method according to claim 8, wherein the determining includes determining that the physical address configuration input of the first device is coupled to the data line.

12. The address configuration method according to claim 8, wherein the determining includes determining that the physical address configuration input of the first device is coupled to the clock line.

13. The address configuration method according to claim 8, further comprising:
receiving the address configuration sequence at a second device that has a clock line input, a data line input, and a physical address configuration input;
capturing data on the physical address configuration input of the second device;
determining from the captured data on the physical address configuration input of the second device and from the address configuration sequence whether the physical address configuration input of the second device is coupled to the fixed voltage potential, the clock line input of the second device, or the data line input of the second device;
setting a post-initialization address of the second device based on the determining of whether the physical address configuration input of the second device is coupled to the fixed voltage potential, the clock line input of the second device, or the data line input of the second device; and
after the initialization stage, responding with the second device to commands passed on the multi-conductor bus that include the post-initialization address of the second device.

14. An I2C slave device, comprising:
a multi-conductor bus interface having a clock line input and a data line input;
a physical address configuration input coupled to one of a first voltage terminal, a second voltage terminal, the clock line input, or the data line input; and
address configuration sequence logic including a clock edge detection circuit and a data capture circuit, the address configuration sequence logic configured to:
capture an address sequence passed via the data line input;
determine, based on the at least one signal from the clock edge detection circuit, to which of the first voltage terminal, second voltage terminal, clock line input, and data line input the physical address configuration input is electrically coupled; and
set an address of the I2C slave device based on which of the first voltage terminal, second voltage terminal, clock line input, and data line input the physical address configuration input is electrically coupled, wherein the address configuration sequence logic is configured to set the address to a first address if the physical address configuration input is coupled to a ground terminal, a second address if the physical address configuration input is coupled to a source voltage terminal, a third address if the physical address configuration input is coupled to the clock line input, and a fourth address if the physical address configuration input is coupled to the data line input.

15. An I2C slave device, comprising:
a multi-conductor bus interface having a clock line input and a data line input;
a physical address configuration input coupled to one of a first voltage terminal, a second voltage terminal, the clock line input, or the data line input; and
address configuration sequence logic including a clock edge detection circuit and a data capture circuit, the address configuration sequence logic configured to:
capture an address sequence passed via the data line input;
determine, based on the at least one signal from the clock edge detection circuit, to which of the first voltage terminal, second voltage terminal, clock line input, and data line input the physical address configuration input is electrically coupled; and
set an address of the I2C slave device based on which of the first voltage terminal, second voltage terminal, clock line input, and data line input the physical address configuration input is electrically coupled, wherein the address configuration sequence logic is configured to determine from the address configuration sequence that the physical address configuration input to the clock line input and set the address of the I2C slave device based on determining that the physical address configuration input of the first slave device is coupled to the clock line input.

16. The I2C slave device according to claim 15, wherein the address configuration sequence logic is configured to retrieve the address from a lookup table.

17. An I2C slave device, comprising:
a multi-conductor bus interface having a clock line input and a data line input;
a physical address configuration input coupled to one of a first voltage terminal, a second voltage terminal, the clock line input, or the data line input; and
address configuration sequence logic including a clock edge detection circuit and a data capture circuit, the address configuration sequence logic configured to:
capture an address sequence passed via the data line input;
determine, based on the at least one signal from the clock edge detection circuit, to which of the first voltage terminal, second voltage terminal, clock line input, and data line input the physical address configuration input is electrically coupled; and
set an address of the I2C slave device based on which of the first voltage terminal, second voltage terminal, clock line input, and data line input the physical address configuration input is electrically coupled, wherein the address configuration sequence logic is configured to determine from the address configuration sequence that the physical address configuration input to the data line input and set the address of the I2C slave device based on determining that the physical address configuration input of the first slave device is coupled to the data line input.

18. The I2C slave device according to claim 17, wherein the address configuration sequence logic is configured to retrieve the address from a lookup table.

19. The I2C slave device according to claim 14, wherein the address configuration sequence logic is configured to retrieve the address from a lookup table.

20. The system according to claim 2, wherein the address configuration sequence includes a start command, a plurality of address bits, and a data direction bit.

21. The system according to claim 3, wherein the first slave device includes an inverter circuit coupled to the physical address configuration input.

22. The system according to claim 4, wherein the address configuration sequence includes a start command, a plurality of address bits, and a data direction bit.

23. The system according to claim 5, wherein the first slave device includes an inverter circuit coupled to the physical address configuration input.

24. The system according to claim 7, wherein the address configuration sequence includes a start command, a plurality of address bits, and a data direction bit.

* * * * *